US008738088B2

(12) United States Patent
Aaltone et al.

(10) Patent No.: US 8,738,088 B2
(45) Date of Patent: May 27, 2014

(54) MOBILE TELECOMMUNICATIONS APPARATUS FOR RECEIVING AND DISPLAYING MORE THAN ONE SERVICE

(75) Inventors: Erkki I. Aaltone, Turku (FI); Larri Vermola, Turku (FI); Tero Naumi, Koski (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1615 days.

(21) Appl. No.: 10/587,768

(22) PCT Filed: Jan. 18, 2005

(86) PCT No.: PCT/IB2005/050208
§ 371 (c)(1),
(2), (4) Date: Mar. 8, 2007

(87) PCT Pub. No.: WO2005/076503
PCT Pub. Date: Aug. 18, 2005

(65) Prior Publication Data
US 2007/0275762 A1    Nov. 29, 2007

(30) Foreign Application Priority Data
Feb. 6, 2004    (GB) .................................. 0402637.3

(51) Int. Cl.
*H04B 1/38*     (2006.01)
*G09G 3/36*     (2006.01)
*H04N 5/45*     (2011.01)
*H04N 7/173*    (2011.01)

(52) U.S. Cl.
USPC ............... 455/566; 345/89; 348/565; 725/87; 725/135

(58) Field of Classification Search
USPC ............................................... 455/414.1, 566
See application file for complete search history.

(56) References Cited

U.S. PATENT DOCUMENTS

| 5,487,143 | A  | * | 1/1996  | Southgate ..................... 715/790 |
| 6,493,038 | B1 |   | 12/2002 | Singh et al. |
| 2002/0154692 | A1 |   | 10/2002 | Martin |

(Continued)

FOREIGN PATENT DOCUMENTS

| EP | 1237302 A3 | 9/2002 |
| GB | 2373680 A  | 9/2002 |

(Continued)

OTHER PUBLICATIONS

PCT International Search Report of International Application No. PCT/IB2005/050208, Date of Completion of Search—May 10, 2005.
Search Report of United Kingdom Application No. GB0402637.3, Date of Search —Jul. 19, 2004.

*Primary Examiner* — Timothy Pham

(57) ABSTRACT

Mobile telecommunications apparatus (UE1) has a receiver (91) for receiving concurrently a plurality of broadcast services containing image data content, and a display device (20) with a display area operable to display an image corresponding to the content of at least one of the services in a first mode in which the content one of the channels is displayed for normal viewing, and a second mode in which the content of more than one of the services is displayed. A mosaic of images (T1-T4) may be displayed from which one may be selected for full screen viewing in the first mode. Also a picture-in-picture (PIP) display may be provided with a facility to swap between displayed images.

18 Claims, 6 Drawing Sheets

(56) References Cited

U.S. PATENT DOCUMENTS

| | | |
|---|---|---|
| 2003/0014752 A1 | 1/2003 | Zaslavsky et al. |
| 2003/0030613 A1* | 2/2003 | Chae ............................. 345/89 |
| 2003/0041334 A1 | 2/2003 | Lu |
| 2003/0078077 A1* | 4/2003 | Kokubo ....................... 455/566 |
| 2003/0088778 A1* | 5/2003 | Lindqvist et al. ............. 713/182 |
| 2003/0229900 A1* | 12/2003 | Reisman ....................... 725/87 |
| 2004/0075769 A1* | 4/2004 | Shy et al. ..................... 348/565 |
| 2004/0075770 A1* | 4/2004 | Lee .............................. 348/565 |
| 2004/0128317 A1* | 7/2004 | Sull et al. ................... 707/104.1 |
| 2004/0255336 A1* | 12/2004 | Logan et al. ................. 725/135 |

FOREIGN PATENT DOCUMENTS

| | | |
|---|---|---|
| JP | 05-308570 | 11/1993 |
| JP | 11-150691 | 6/1999 |
| JP | 11-164215 | 6/1999 |
| JP | 11-215217 | 8/1999 |
| WO | WO 03/019900 | 3/2003 |
| WO | WO 03/045064 A1 | 5/2003 |
| WO | WO 2004/004322 A1 | 1/2004 |

* cited by examiner

Fig. 1
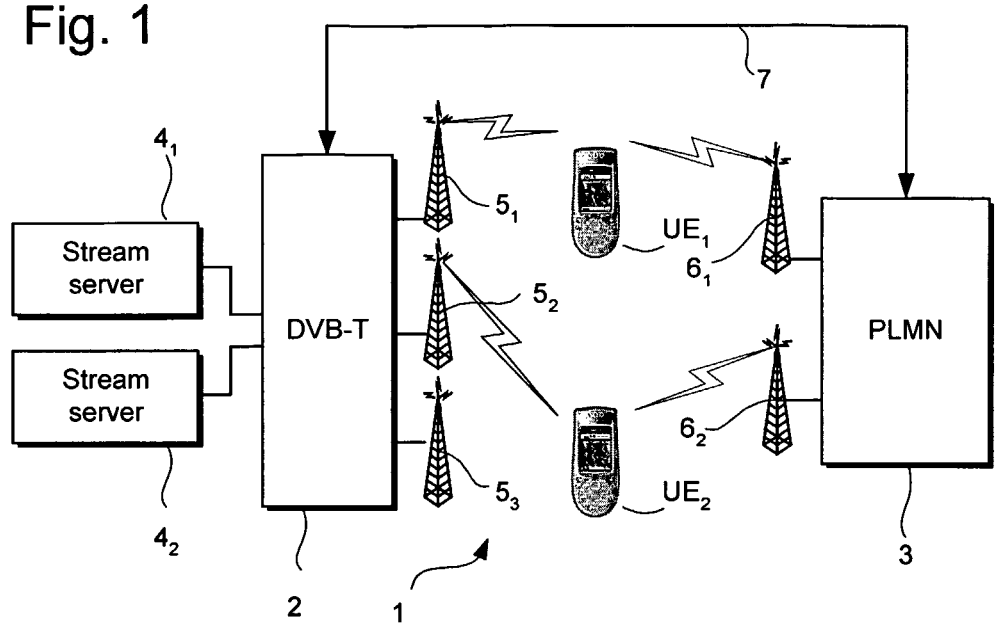
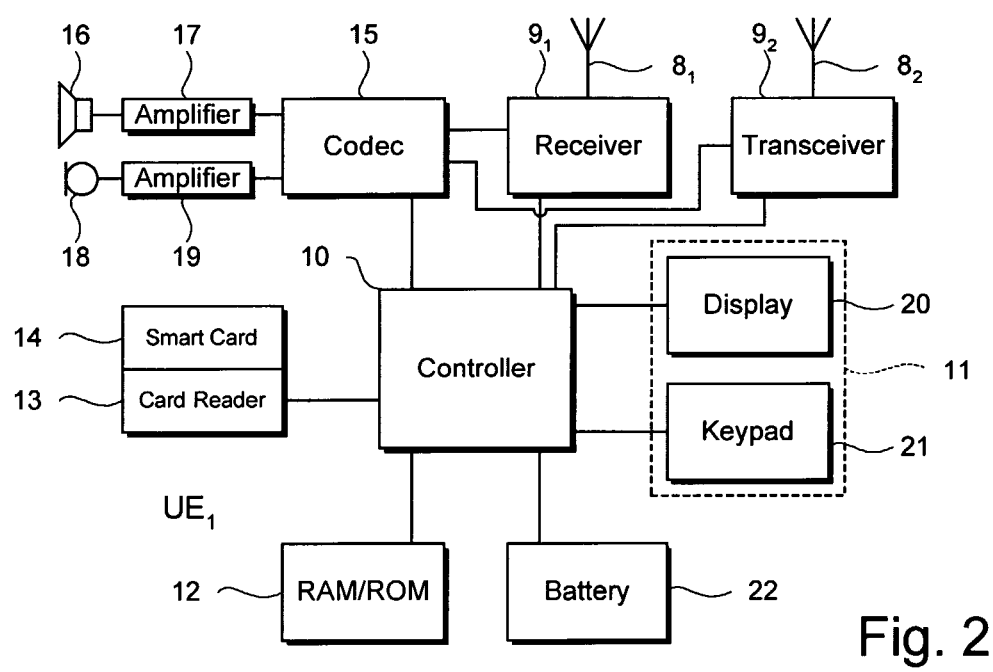
Fig. 2
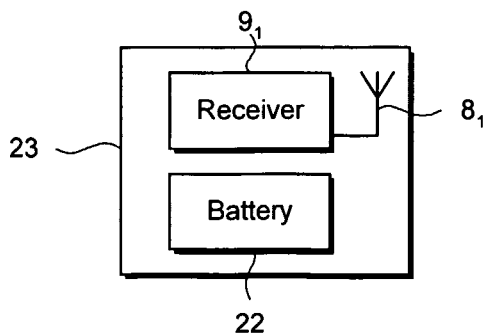
Fig. 3

MOBILE TELECOMMUNICATIONS APPARATUS FOR RECEIVING AND DISPLAYING MORE THAN ONE SERVICE

FIELD OF THE INVENTION

This invention relates to mobile telecommunications apparatus capable of receiving broadcast content and has particular but not exclusive application to apparatus for receiving and displaying video content received according to a digital video broadcasting (DVB) standard such as satellite broadcast (DVB-S) or terrestrial DVB (DVB-T) and DVB handheld (DVB-H).

BACKGROUND

Hitherto it has been proposed to provide a mobile telecommunications apparatus operable both as a handset with a mobile network and also as a receiver for broadcast video content. The apparatus includes a transceiver for communicating with a mobile telecommunications network such as a 2G, 2.5G or 3G network. The apparatus also includes a receiver to receive separately broadcast video content e.g. according to a DVB standard using MPEG signal formats. A plurality of digital broadcast channels may be broadcast concurrently so that the user can choose between them.

Hitherto, it has been proposed to include service guide information in the broadcast channels to permit a service guide of the content of the channels to be stored in the mobile apparatus. Typically, this service guide information comprises a textual description of broadcast content and the associated transmission times. It has also been proposed to provide current service guide information as text through the mobile telecommunications network, e.g. through a wireless application protocol (WAP) portal.

However, the mobile apparatus has a display screen of limited size due to its portability and providing the service guide information as text can provide only a limited insight into the content of the broadcast channels. Furthermore, when the service guide information is obtained through a WAP portal, the information retrieval process is time consuming and inconvenient.

The present invention seeks to overcome these problems and disadvantages.

SUMMARY OF THE INVENTION

According to the invention there is provided mobile telecommunications apparatus comprising a transceiver for wireless communication with a telecommunications network, rendering means operable to render concurrently data content corresponding to a plurality of services, and a receiver to receive at least one of the services when broadcast thereto to be rendered, the rendering means including a display device with a display area operable to provide a visual display corresponding to the content of at least one of the services, wherein the display device is operable in a first mode in which content corresponding to one of the services is displayed for normal viewing, and a second mode in which content corresponding to more than one of the services is displayed.

The mobile apparatus may include a user interface operable to allow a service selection to be made from the services displayed in the second mode, for normal viewing in the first mode. Thus, the user interface can be used to select a particular service being displayed, for normal viewing.

The invention has the advantage that content corresponding to the services is displayed for selection, which allows a much quicker and easier service selection to be made.

In order to simplify signal processing, the display device may be operable in the second mode to display the image data content of one of the services with a higher quality than another. For example, the content of one of the available services may be displayed as a video display whereas the or each other service may be displayed as a still image or a succession of still images.

Different ones of the services may be displayed in the second mode in high quality, for example successively or under the control of a user through a user interface. The interface may also allow the user to select a particular number of services that are to have their contents displayed in the second mode. The services displayed in the second mode may be presented as a mosaic of tiles corresponding to the content of the services. The tiles may be of an equal size or so that one is larger than the other. For example, the larger tile may display the image of higher quality than the or each smaller tile. The user interface may be provided for changing the size and/or location of a selected one of the tiles.

The display device may also be operable in the second mode to display the content for services in a picture-in-picture (PIP) display, in which one relatively small image corresponding to the content of a first one of the services is displayed in a relatively small area within a relatively large area that displays the content of a second one of the services.

A user interface may be provided to switch the content for the first one of the services displayed in the small area, to the large area, and simultaneously for the content of the second one of the services displayed in the large area to be switched to the small area.

The apparatus according to the invention may be operable to receive DVB broadcasts and may include a recorder to record received video content for replay, to provide the content of one of the display services.

The invention also includes a method of displaying content on a mobile telecommunication apparatus comprising operating the display in a first mode in which the content for one of the services is displayed for normal viewing, or a second mode in which the content for more than one of the services is displayed.

The invention furthermore includes a computer program to be run on a processor in mobile telecommunications apparatus to perform the inventive method.

The invention also provides a user interface for a mobile telecommunications apparatus comprising a transceiver for wireless communication with a telecommunications network, a receiver for receiving concurrently content corresponding to a plurality of broadcast services, and a display device, the user interface being operable to control the display device so as to display content corresponding to at least one of the services in a first mode in which the content for one of the services is displayed for normal viewing, and a second mode in which content corresponding to more than one of the services is displayed.

BRIEF DESCRIPTION OF THE DRAWINGS

In order that the invention may be more fully understood an embodiment thereof will now be described by way of example with reference to the accompanying drawings wherein:

FIG. 1 is a schematic block diagram of a mobile communications system including a DVB-T cellular network and a mobile telecommunications network according to an embodiment of the invention, FIG. 2 is a block diagram of the circuits of a mobile telephone handset configured to receive DVB-T transmissions according to an embodiment of the invention, FIG. 3 illustrates a battery pack for the handset according to an embodiment of the invention.

DETAILED DESCRIPTION

Figure 4A:
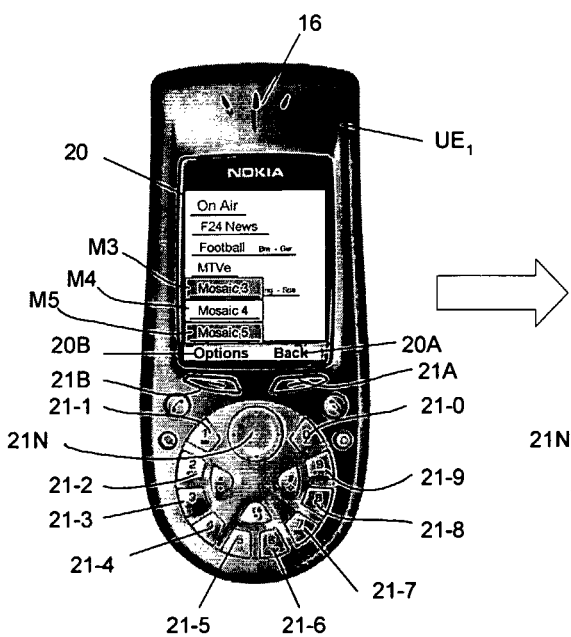
FIGS. 4A-4F illustrate a sequence of displays provided on the mobile telephone handset $UE_1$ for selecting a DVB-T service through the use of a mosaic display, in accordance with an embodiment of the invention.

FIG. 1 illustrates schematically a communication system in which mobile user equipment in the form of mobile telephone handsets $UE_1$, $UE_2$ are configured to receive transmissions from a DVB-T network 2 and also to communicate through a public land mobile network (PLMN) 3. The configuration of DVB-T for mobile handsets is also referred to as DVB handheld or DVB-H.

The DVB-T network 2 transmits content such as audiovisual content, data files or images to the handsets $UE_1$, $UE_2$. The content is obtained from data stream servers $4_1$, $4_2$ in Internet protocol (IP) so that the network can provide an IP data casting (IPDC) service using the DVB-T network. Two such servers 4 are shown by way of example although in practice there may be many more.

The DVB-T network 2 is cellular and antennas $5_1$, $5_2$ and $5_3$ serve individual cells of the network at geographically spaced sites S1, S2, S3.

DVB-T uses MPEG-2 transport streams and so the IP data needs to be encapsulated into the DVB transmission signals. Data streams comprising IP datagrams supplied from one or more of the servers 4, are encapsulated by an IP encapsulator (not shown) within the network 2. The encapsulated IP stream is then transported to one or multiple transmission sites, which form cells of the DVB-T network, on an MPEG-2 transport stream TS.

IP packets containing the data can be embedded in multiprotocol encapsulation (MPE) sections which are transported within the TS packets. For further details, reference is directed to ETSI EN 301 192 V1.3.1 (2003-01) "Digital Video Broadcasting (DVB) DVB specification for data broadcasting" Section 7. The MPE sections may also include forward error correction (FEC) information and time slicing information, by which data is conveyed discontinuously and allows the UEs to save battery power by switching off when no data is being transmitted to them.

The stream servers $4_1$, $4_2$ may also provide audiovisual content that comprises conventional DVB streams in MPEG format.

The PLMN 3 may comprise any suitable 2G, 2.5G or 3G network with antennas $6_1$ and $6_2$ that serve individual cells of the PLMN. A communication channel 7 may be provided between the DVB-T network and the PLMN 3 to allow bi-directional communication between the networks e.g. for the interchange of service information.

FIG. 2 illustrates the circuits of the mobile handset $UE_1$ by way of example. Handset $UE_2$ is of a substantially similar configuration. The handset includes first and second antennas $8_1$, $8_2$, a receiver $9_1$ and a transceiver $9_2$. The first antenna $8_1$ and receiver $9_1$ are configured to receive signals from the DVB-T network 2. The second antenna $8_2$ and transceiver $9_2$ are used to transmit and receive signals to and from the PLMN 3. The receiver and transceiver $9_1$, $9_2$ each include respective rf signal processing circuits (not shown) for amplifying and demodulating received signals and respective processors (not shown) for channel de-coding and de-multiplexing.

The handset $UE_1$ also includes a controller 10, a user interface 11, RAM/ROM memory 12, a smart card reader 13, smart card 14 received in the smart card reader 13, a decoder/decoder (codec) 15, a speaker 16 with corresponding amplifier 17 and microphone 18 with corresponding preamplifier 19. Also, the memory 12 may include e.g. flash type memory that is received in a connector (not shown) so as to be detachable and interchangeable, having pre-recorded content stored therein or that can be used for recording received content for later use and rendering.

The user interface 11 comprises a display 20 and keypad 21. The display 20 is configured to display images and video and is capable of displaying colour images. The device also includes a rechargeable battery 22.

The controller 10 manages operation of the handset under the direction of computer software, stored in memory 12. For example, the controller 10 provides an output for the display 20 and receives inputs from the keypad 21. The configuration of the handset $UE_1$ is shown in more detail in FIG. 4A. The keypad 21 has the usual numerical keys 21-0; 21-1 . . . 21-9 for telephony arranged in a circle in this example, together with so-called soft keys 21A, 21B which have their functionality controlled by the controller 10 depending on the activity being performed. Display regions 20A 20B are also controlled by the controller 10 to display the current functionality of the soft keys 21A, 21B to the user. The keypad 21 also includes and a navigation key 21N which in one embodiment of the invention can be rocked by the user to provide up, down left and right control of a focus region corresponding to a cursor, to move the focus region around regions of the display 20 in order to allow different regions of the display to be selected by the user. The key 21N can also be pressed downwardly to perform a "select" function for a display item highlighted by the focus region, as will be explained in more detail hereinafter. In other embodiments of the invention the navigation key 21N may have more than four positions and these positions may be combined with the downwardly pressed position for e.g.

"enlarging" or "diminishing" or "dragging" the selected focus area within the display.

Referring to FIG. 3, the battery 22, the first antenna $8_1$ and the receiver $9_1$ may be incorporated into a battery pack 23 in an embodiment of the invention. By replacing the battery pack (not shown) in a conventional mobile telephone handset with a battery pack 23 including the receiver $9_1$ and also by providing suitable software, a conventional mobile telephone handset may be modified to receive data via the DVB-T network 2. Alternatively, the first antenna $8_1$ and the receiver $9_1$ may be incorporated into a cover (not shown) for a conventional mobile telephone handset so that by replacing the cover and necessary software for the handset, the conventional handset can be upgraded to receive transmissions from the DVB-T network 2.

The handset $UE_1$ can receive DVB-T transmissions through receiver $9_1$ from the DVB-T network 2. The transmissions may be received in a single frequency in which a number of different services of audiovisual and other content are included by time division multiplexing as time sliced bursts.

First Mode

In a first mode of operation of the handset $UE_1$ the received DVB-T signal is amplified, demodulated, channel de-coded and demultiplexed by the receiver $9_1$. The resulting demultiplexed signal is filtered so as to extract bursts of datagrams for the service concerned. The bursts may contain information concerning the occurrence of the next burst so that the receiver can be powered down between bursts in order to save power. Datagram bursts are fed into a time slice buffer that is provided by the controller 10 and memory 12 so as to produce a stream of datagrams that are not time sliced. The datagram stream is substantially continuous and/or at a substantially constant rate. The resulting data stream is then rendered by the controller 10 and the display device 20 so as to be displayed on display device 20 in respect of video signals. The audio signals are passed through codec 15 and amplifier 17 to speaker 16.

Second Mode

Also, the handset $UE_1$ can be operated in a second mode in which more than one of the services are concurrently demultiplexed and displayed, in which case more than one datagram stream is produced by the receiver $9_1$ corresponding to more than one broadcast service, and the streams are fed by the controller 10 to be displayed concurrently by the display device 20. The user can select the services to be rendered and displayed concurrently.

The transceiver $9_2$ is for use with PLMN 3 and uses a conventional mobile telecommunications protocol to achieve bi-directional voice and data communication under the control of controller 10, with displays being provided on display 20 and audio being handled by means of speaker 16 and microphone 18.

Use of Mosaic Display ($2^{nd}$ Mode)

An embodiment of the invention will now be described in which a plurality of displays corresponding to the content of concurrent "on-air" DVB-T transmissions is displayed in the aforesaid second mode, to allow a user to select one of them for full display over the entire display screen 20, in the first mode. The selection process will be described in more detail with reference to FIGS. 4 and 5.

Figure 4B:
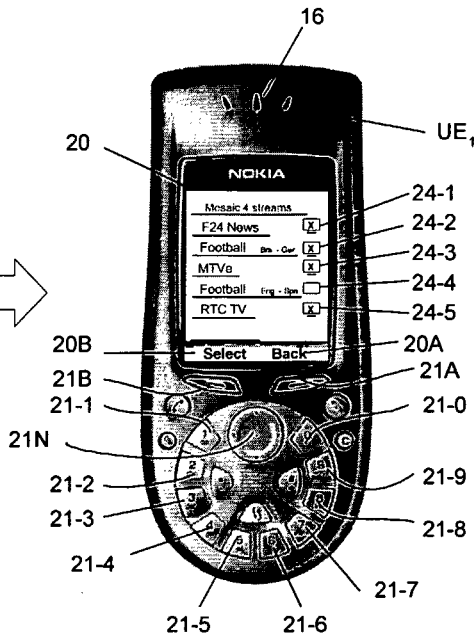
Figure 5:
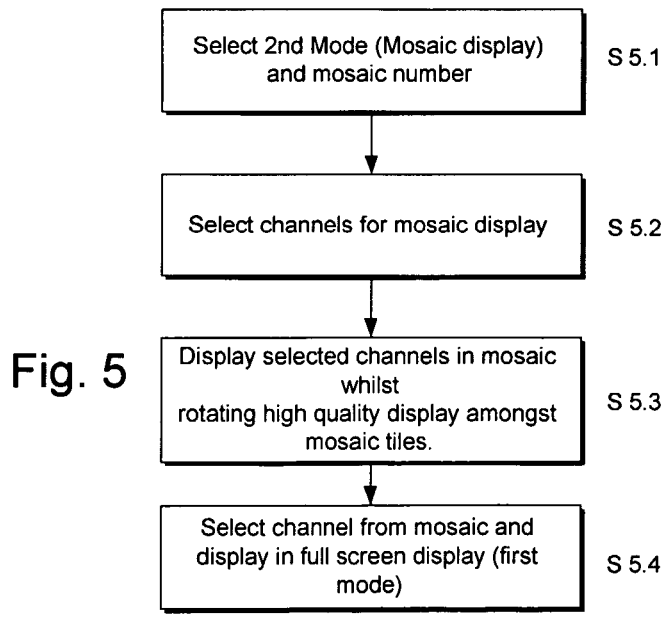
FIG. 5 illustrates a series of process steps for providing the mosaic display according to an embodiment of the invention.

Referring firstly to FIG. 4A and step S5.1 in FIG. 5, the user operates the keypad 21 so as to select a display corresponding to the currently available broadcast services that can received by $UE_1$ through the DVB-T network. This information may be derived from a WAP portal through PLMN 3 (FIG. 1) or may be stored in the memory 12 of the handset as an electronic service guide developed from data transmitted through the DVB-T network on a service channel. As can be seen clearly from FIG. 4B, five services are currently available (although more may be available and made visible by scrolling). In this example, a news service, two football services, together with the services MTV and RTC are available for selection.

Referring back to FIG. 4A, the user operates soft key 21B to select a mosaic option. The user has a choice of providing a mosaic of 3, 4 or 5 of the available services and mosaic display options M3, M4, and M5 are displayed on screen 20 by means of the controller 10. The user operates navigation key 21N to move the focus region so as to select one of the mosaic options M3-5. In this example, the user highlights mosaic option M4 and subsequently depresses navigation key 21N to select a mosaic display of four currently available channels.

Referring to step S5.2 and FIG. 4B, the user then selects which of the services are to be displayed in the mosaic. Using the navigation key 21N, the user moves the focus region to individual dialog boxes 24-1, 2, 3, 4, 5 and, for each dialog box the corresponding service can be selected by depressing the navigation key 21N or operation of the soft key 21B which is currently assigned a "select" function by controller 10. Four services for the mosaic can be selected in this instance are signified by "X" in the corresponding dialog boxes.

Figure 4C:
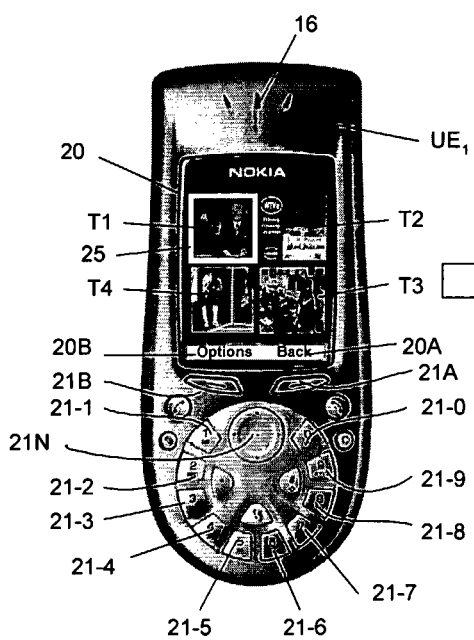
Figure 4D:
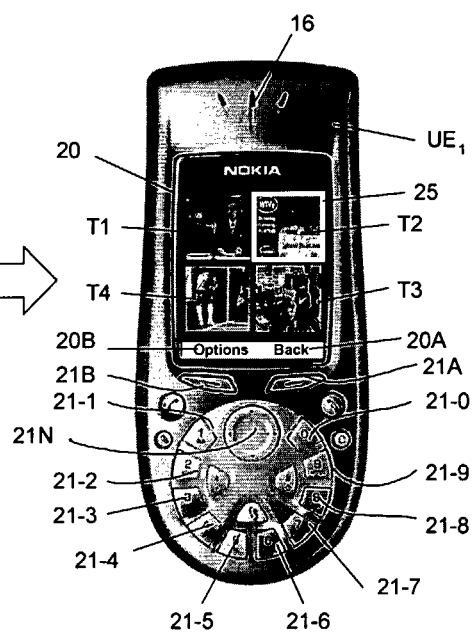

Then, as indicated at step S5.3 in FIG. 5, the four selected services are displayed in a mosaic, as shown in FIG. 4C. In this example, a news service, football service, MTV and RTC services are selected which are displayed as four contiguous image tiles T1-T4 of equal size. The tiles T1-T4 may be displayed such that one of them has a higher image quality than the others. In this example, tile T1 has a high image quality and is highlighted by a perimeter band 25. Thus, the image in tile T1 may correspond to the real time video streaming content from the service corresponding to tile T1—the news service in this instance. The services displayed in tiles T2-T4 are of a lower image quality for example, a lower pixel density or, a sequence of time spaced images sampled from the video feed for the services concerned so as to provide a low quality, succession of still images.

In accordance with one embodiment of the invention, the controller 10 sequentially selects one of the tiles T for display with a high quality image and thus the highlighted perimeter 25 may move from tile to tile after a predetermined period e.g. 30 seconds. Alternatively, the user may operate the navigation key 21N to select one of the displayed tiles in high quality according to a user preference. The operation of navigation key 21N may override the sequential operation performed by controller 10, which may occur as a default. Thus, referring to FIG. 4D, the highlighted perimeter 25 has moved from tile T1 to tile T2, which is now shown in high quality as compared with the other tiles.

Figures 4E, 4F:
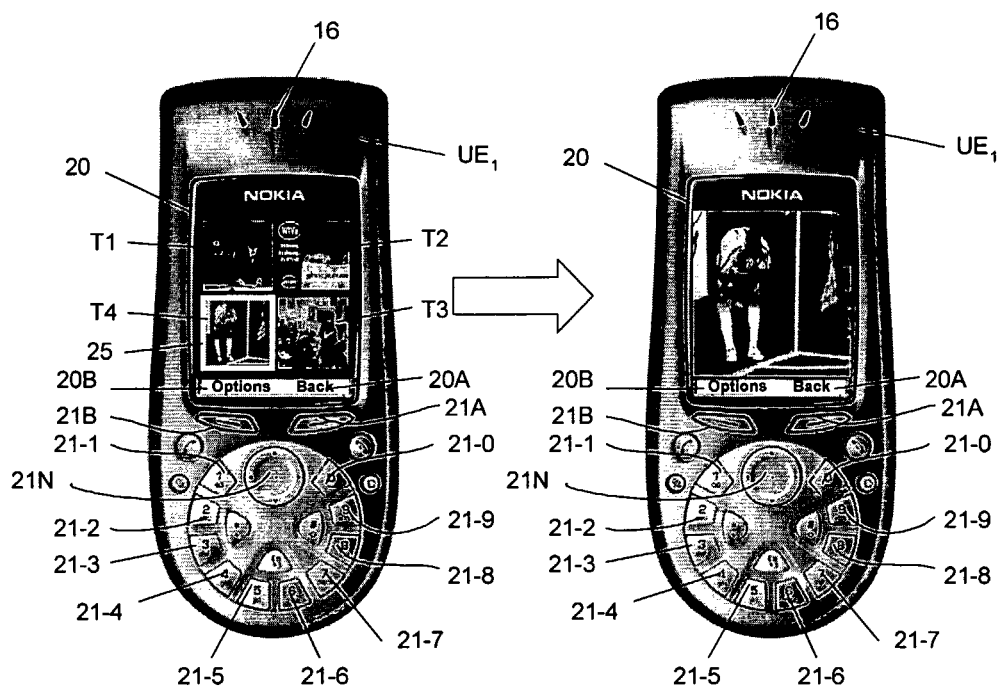

In FIG. 4E, the highlighted region 25 has been moved to tile T4 corresponding to the displayed football service. Then, as illustrated at step S5.4 in FIG. 5, the user may select one of the tiles for full screen display i.e. to file the entire operative viewing area of the display 20. The selection is performed by either depressing the navigation key 21N or by operating the soft key 21B to open an options menu from which a "select" option can be selected.

Then, the selected service is displayed over the entire viewing area of display 20 as illustrated in FIG. 4F.

When in the first mode i.e. with the service displayed over the entire viewing area of display 20, the user can change to another service in full screen mode by pressing the navigation key 21N or from the Options menu selectable by soft key 21B. Operation of soft key 21A corresponding to the "back" function returns to the mosaic display.

The described mosaic display selection method thus provides a convenient, user friendly way of selecting video streaming from the on air services for full screen display.

In the embodiment described with reference to FIG. 4, the tiles T1-T4 are all of the same size and arranged contiguously. However, alternative configurations are possible in which the tiles are not all of the same size and may overlap one another. Furthermore, the size of the tiles may be selectable by the user. Some examples will now be described with reference to FIG. 6.

Figure 6A:
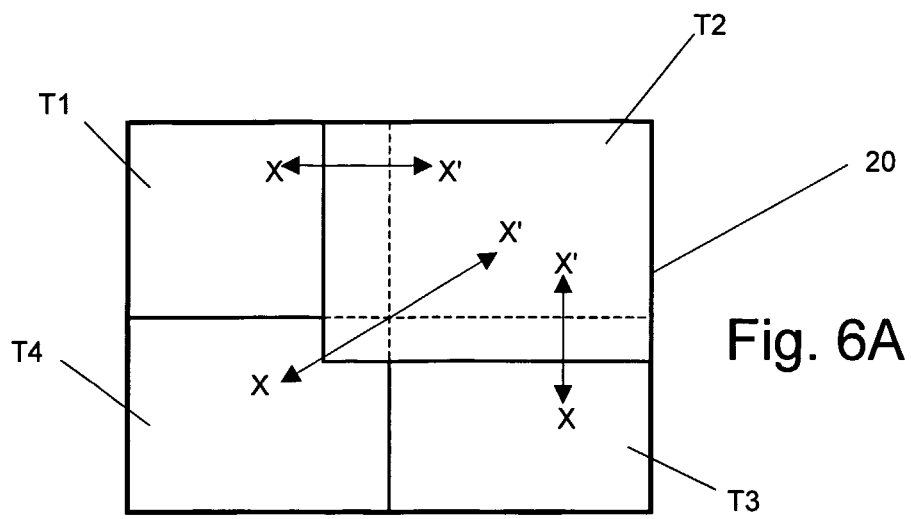
FIGS. 6A-6C illustrate alternative mosaic displays according to various embodiments of the invention.

Referring to FIG. 6A, the tiles T1-T4 are shown schematically within the display 20. The user may operate the keypad 21 in order to expand the size of a selected one of the tiles. In this example, tile T2 can be expanded so as to overlie the tiles T1, T3, T4 in the direction of arrows X. Also, the tile T2 may be switched back into the configuration shown in FIG. 4, in the direction of arrows X' so as to be contiguous with the other tiles T1, T3, T4. This arrangement allows the user to temporarily expand one of the tiles to examine the channel content displayed therein in more detail.

Figure 6B:
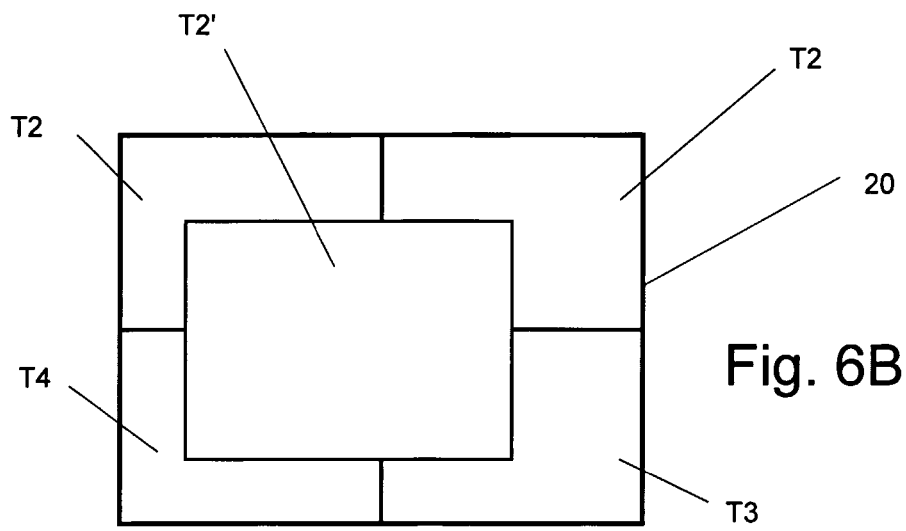

In another example shown in FIG. 6B, a selected tile e.g. T2 can be expanded to overlie the other tiles for more detailed examination. The tile T2 has been expanded into a display position T2' overlying the other tiles. The display tile T2' can be selected by appropriate manipulation of the keypad 21. For example, the navigation key 21N may have eight rocker positions corresponding to 'north', 'north-east', 'east', 'south-east' etc., whereby the size of a selected tile T can be changed in diagonal direction. The tile T2' may be displayed in a higher quality than the others. The original tile T2 may be of the original display quality or the place may be blank.

Figure 6C:
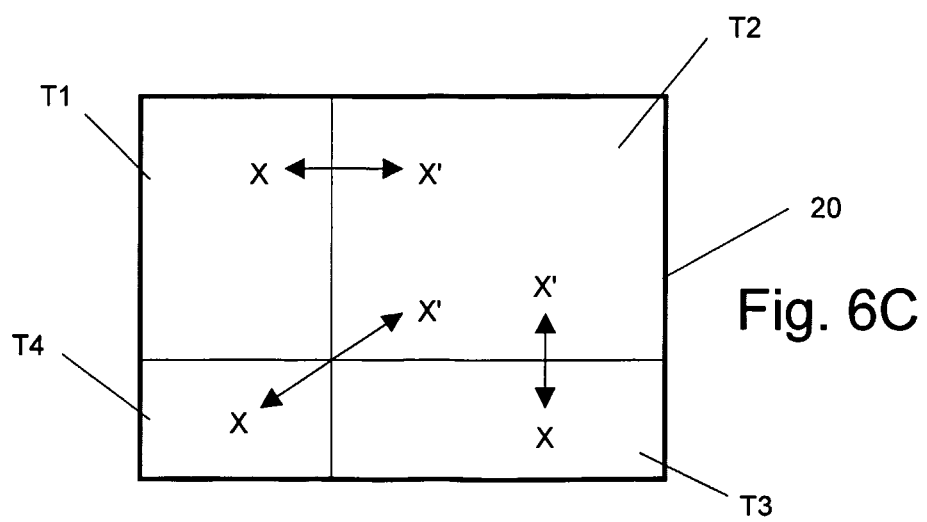

In the modification of FIG. 6C, the selected tile T2 is expanded by means of one or more keys of the keypad 21 in the arrow direction X and the other tiles T1, T3 and T4 are commensurately reduced in size so as to remain contiguous with the expanded tile T2. This allows the user to examine tile T2 in more detail on a temporary basis and then switch the tile back to its previous size in the direction of arrows X'. The expanded tile T2 may be displayed in a higher quality than the others.

Use of Picture-In-Picture Display ($2^{nd}$ Mode)

An embodiment of the invention will now be described in which two displays corresponding to concurrent DVB-T transmission are displayed in a picture-in-picture (PIP) display in the aforesaid second mode, to allow the user to switch between them and thereafter provide a full display of the entire screen of the display 20, in the first mode if desired. The process will be described in more detail with reference to FIGS. 7 and 8.

Figures 7A, 7B:
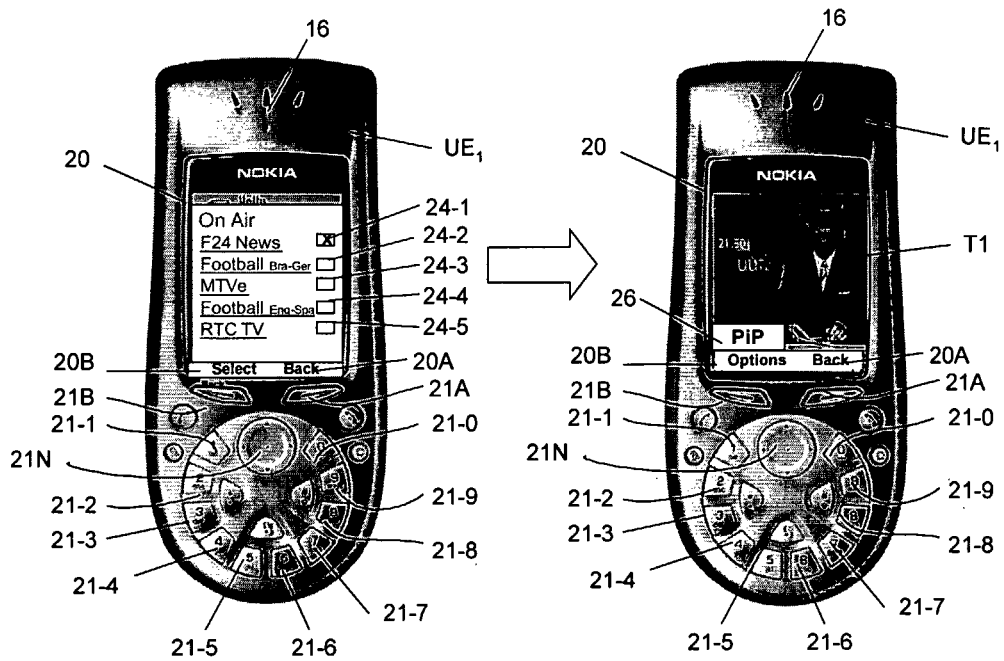
FIGS. 7A-7F illustrate a sequence of displays provided on the mobile telephone handset $UE_1$ for selecting a DVB-T service through the use of a PIP display, in accordance with an embodiment of the invention.
Figure 8:
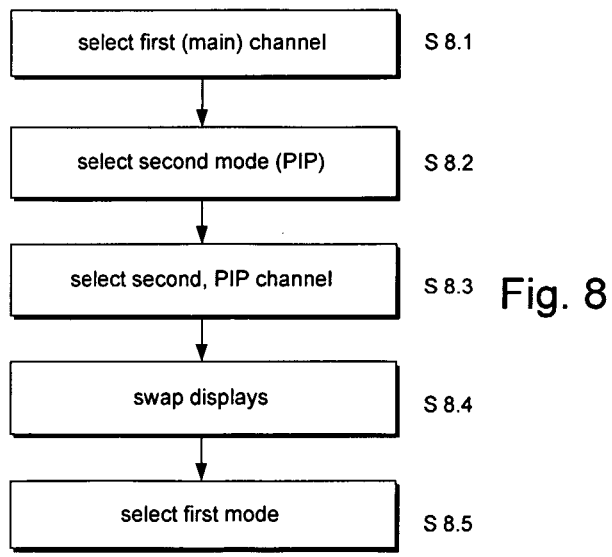
FIG. 8 illustrates a series of process steps for providing the PIP display according to an embodiment of the invention.

Referring to FIG. 7A details of the currently available streaming services are displayed on display 20 of the handset by reference to the electronic service guide or a WAP portal, as previously described with reference to FIGS. 4A and 4B. Then, at step S8.1 in FIG. 8, one of the available services is selected for display in the manner previously described with references to FIG. 4B, by checking one of the dialog boxes 24-1 to 24-5 shown in FIG. 7A. In the example shown in FIG. 7A, the news service is selected by checking box 24-1. The resulting display is shown in FIG. 7B, in which the news service is displayed over the entire viewable area of the display screen 20.

Referring to FIG. 7B and step S8.2, the PIP mode is selected through the use of the soft key 21B and the menu options available under the "Options" 20B. A legend 26 is displayed, indicating that the PIP is available for selection as a menu option, and it is then selected using the navigation key 21N.

Figures 7C, 7D:
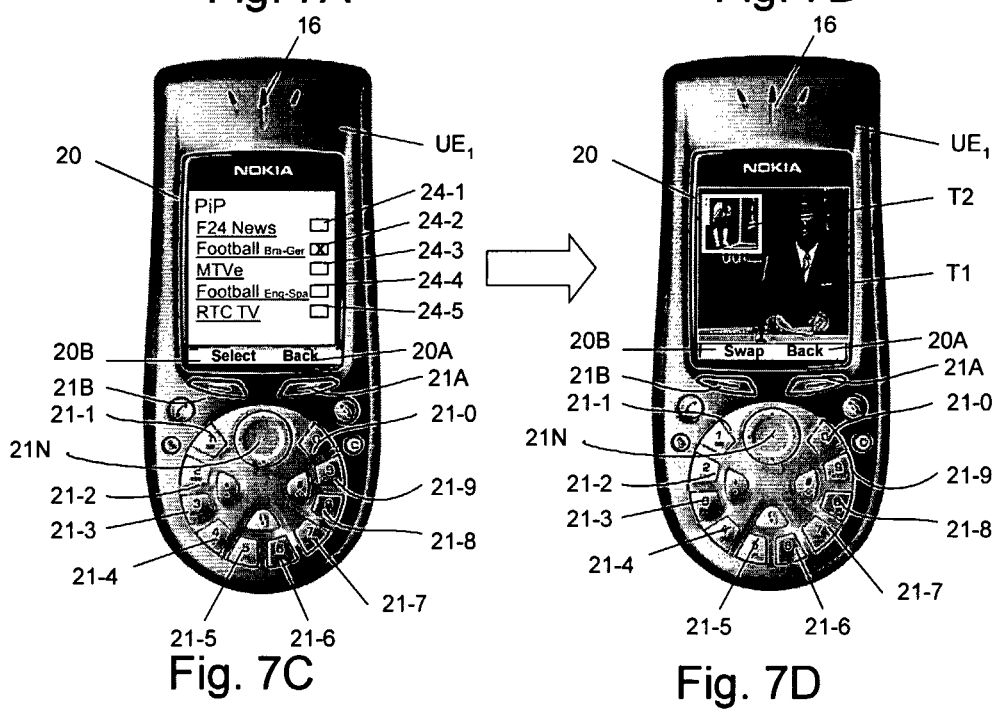
Figures 7E, 7F:
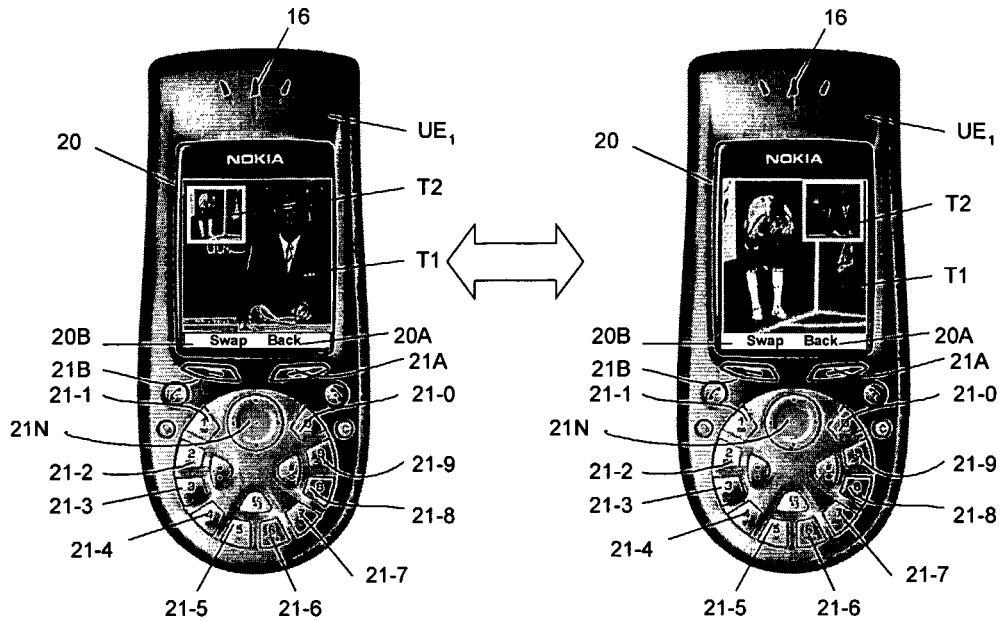

The resulting display is shown in FIG. 7C, in which the available services for the PIP display are displayed to the user. Then, at step S8.3, the user selects a second service for display as the picture-in-picture for the PIP mode. The service for the PIP display is selected in the same way as the main display, by checking one of the dialog boxes 24-1 to 24-5. In this example, the dialog box 24-2 is checked in order to select a football service for the PIP display.

The resulting PIP display shown in FIG. 7D, with the news service being shown as the main tile image T1 and a PIP image T2 of smaller dimensions, within the main image tile T1.

The content presented in the tiles T1 and T2 can be swapped. This is illustrated schematically as step S8.4 in FIG. 8 and illustrated in FIGS. 7E and 7F. By selecting a swap function by means of soft key 21B, the user can swap the content in the tiles T1 and T2. Successive operations of the soft key 21B swaps the contents successively. In this way, the user can review the current video streams received in two services. Also, if desired, the user can at step S8.5 select one of the services only for display and thereby switch off the PIP display so that a single service is displayed over the entire display area of the display 20.

Many modifications and variations fall within the scope of the claimed invention. For example, the size of the picture-in-picture display T2 may be adjustable under the control of the user by means of the keypad 21 e.g by use of the soft keys 21A or 21B. Also the location of tile T2 may be adjustable by the user or automatically on swapping, as can be seen by comparing the location of T2 in FIG. 7E and FIG. 7F. Also the images for T1 and T2 may be of different qualities as previously described.

The mobile telecommunication apparatus according to the invention may be used to render audio, visual, textual or other content. The invention is not restricted to displayed images or video but any type of digital content can be consumed or rendered. If the selected service, e.g. an audio file does not contain visually displayable content the corresponding tile may be left blank or an icon or image stored in the terminal (which may possibly be animated) may be displayed in addition to or instead of textual data associated with the audio file. The stored icons or images can be received from broadcast transmissions or otherwise downloaded to the terminal or created by the user.

Also, the data streaming services for the handset $UE_1$ may be received through the PLMN 3 shown in FIG. 1.

Furthermore, the rendering is not restricted to content that is broadcast at the time of consuming, and content that has been received and stored earlier can be input to a mosaic tile or to the PIP. To this end, the memory 12 of the handset may be sufficiently large to enable video streams to be recorded and subsequently replayed to provide an additional service for display. Also, it is possible to use as input to the mosaic/PIP, content that is pre-recorded e.g. on a detachable storage device such as a flash memory stick, which may functionally comprise a part of the memory 12. Such content can be selected from the menu in a similar way as broadcast services. The memory 12 may thus contain pre-recorded content corresponding to a service that is personal to the user of the apparatus and not related to the broadcast services e.g. a music video or a video clip or slide show of images taken with a personal digital camera, which may itself be in the handheld device UE. The user can then select the personal service from the memory 12 using the mosaic as previously described.

Alternatively, the PIP mode can be used to display the personal service from the memory 12 as the large display with e.g. a broadcast news service or a broadcast football game being displayed in the small display, so that the user can watch the personal service from the memory as a default and switch to the news service when a news item of interest is broadcast, or in the case of a football game, when a goal is scored. Whilst the device $UE_1$ has been described in terms of a mobile telephone handset, it may also comprise a personal digital assistant PDA or other mobile terminal capable of at least receiving signals from the DVB-T network 2. The device $UE_1$ may also be semi-fixed or semi-portable such as terminal in a vehicle.

The invention claimed is:

1. An apparatus:
wherein the apparatus is configured for communication within a telecommunications network, and also configured to receive at least one of a plurality of broadcast services;
the apparatus comprising a controller and a memory storing computer program code wherein the memory and the computer program code are configured to, with the controller, enable the apparatus to control a display to provide a visual display corresponding to content of at least one of the services, such that in a first mode of operation content corresponding to one of the services is displayed for normal viewing, and in a second mode of operation content corresponding to more than one of the services is displayed, and
wherein the display is controlled, in the second mode of operation, to display the content of the services in a mosaic of contiguous image tiles corresponding to the content of the services and the apparatus is configured to enable a user to change the size and/or location of a selected one of the image tiles, wherein in response to the user change, non-selected image tiles are commensurately changed in size and/or location to remain contiguous with the selected one of the image tiles and the selected image tile is displayed in a higher quality than the non-selected image tiles.

2. The apparatus according to claim 1 including a user interface configured to enable a selection to be made from the services displayed in the second mode of operation for normal viewing in the first mode of operation.

3. The apparatus according to claim 1 wherein said higher quality of the selected image tile comprises a video and the display of at least one of the non-selected image tiles comprises a still image or a succession thereof.

4. The apparatus according to claim 1 wherein the display is controlled, in the second mode of operation, to display different ones of the displayed services in said higher quality.

5. The apparatus according to claim 4 wherein the display is controlled to display different ones of the displayed services in said higher quality, successively.

6. The apparatus according to claim 4 including a user interface configured to enable a user to select which service is to be displayed in said higher quality.

7. The apparatus according to claim 1 including a user operable interface configured to enable a user to select the number of services that are to have their content displayed in the second mode.

8. The apparatus according to claim 1 including a user operable interface configured to enable a user to select which services are to have their content displayed in the second mode.

9. The apparatus according to claim 1 wherein apparatus is configured to enable a user to choose to make the mosaic of contiguous image tiles of equal size.

10. The apparatus according to claim 1 wherein apparatus is configured to enable a user to choose to make the mosaic of contiguous image tiles so that the selected image tile is larger than the or each other image tile.

11. The apparatus according to claim 1 wherein the image tiles abut one another.

12. The apparatus according to claim 1 wherein the apparatus is configured to receive digital video broadcasting broadcasts corresponding to a plurality of the services.

13. The apparatus according to claim 1 wherein the apparatus is configured to record video content for replay to provide the content of one of said displayed services.

14. The apparatus according to claim 1 wherein the apparatus is configured to receive a detachable memory storing data corresponding to at least one of the services.

15. The apparatus according to claim 1 wherein the apparatus is a mobile telecommunications handset.

16. A method comprising:
receiving at least one of a plurality of broadcast services by an apparatus configured for communications within a telecommunications network;
enabling the apparatus to control a display to provide a visual display corresponding to content of at least one of the services; and
configuring the apparatus in ether of a first mode of operation or a second mode of operation such that in the first mode of operation content corresponding to one of the services is displayed for normal viewing, and in the second mode of operation content corresponding to more than one of the services is displayed, wherein the display is controlled, in the second mode of operation, to display the content of the services in a mosaic of contiguous image tiles corresponding to the content of the services and the apparatus is configured to enable a user to change the size and/or location of a selected one of the image tiles, wherein in response to the user change, non-selected image tiles are commensurately changed in size and/or location to remain contiguous with the selected one of the image tiles and the selected image tile is displayed in a higher quality than the non-selected image tiles.

17. A non-transitory computer readable storage medium comprising computer program instructions which, when run on a processor enable an apparatus configured for communications within a telecommunications network to perform:
controlling a display to provide a visual display corresponding to content of at least one of the services; and
configuring the apparatus in ether of a first mode of operation or a second mode of operation such that in the first mode of operation content corresponding to one of the services is displayed for normal viewing, and in the second mode of operation content corresponding to more than one of the services is displayed, wherein the display is controlled, in the second mode of operation, to display the content of the services in a mosaic of contiguous image tiles corresponding to the content of the services and the apparatus is configured to enable a user to change the size and/or location of a selected one of the image tiles, wherein in response to the user change, non-selected image tiles are commensurately changed in size and/or location to remain contiguous with the selected one of the image tiles and the selected image tile is displayed in a higher quality than the non-selected image files.

18. A user interface for an apparatus wherein the apparatus is configured for communication within a telecommunications network and also configured to receive at least one of a plurality of broadcast services; the user interface comprising a display wherein the display is controlled to have a first mode of operation and a second mode of operation such that in the first mode of operation content corresponding to one of the services is displayed for normal viewing, and in the second mode of operation content corresponding to more than one of the services is displayed, wherein the display is controlled, in the second mode of operation, to display the content of the services in a mosaic of contiguous image tiles corresponding to the content of the services and the apparatus is configured to enable a user to change the size and/or location of a selected one of the image tiles, wherein in response to the user change, non-selected image tiles are commensurately changed in size and/or location to remain contiguous with the selected one of the image tiles and the selected image tile is displayed in a higher quality than the non-selected image files.

* * * * *